Figure 1:
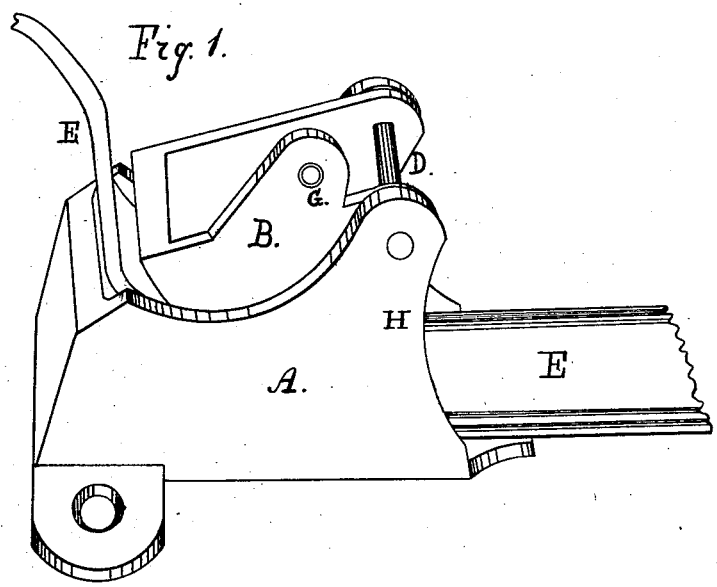

2 Sheets  Sheet 1.

H. W. Burgess.
Strap-Holder.

Nº 73230  Patented Jan. 14, 1868.

Witnesses  Inventor
J. M. M<sup>c</sup>Elheny  Henry W. Burgess
Samuel J. Parker.

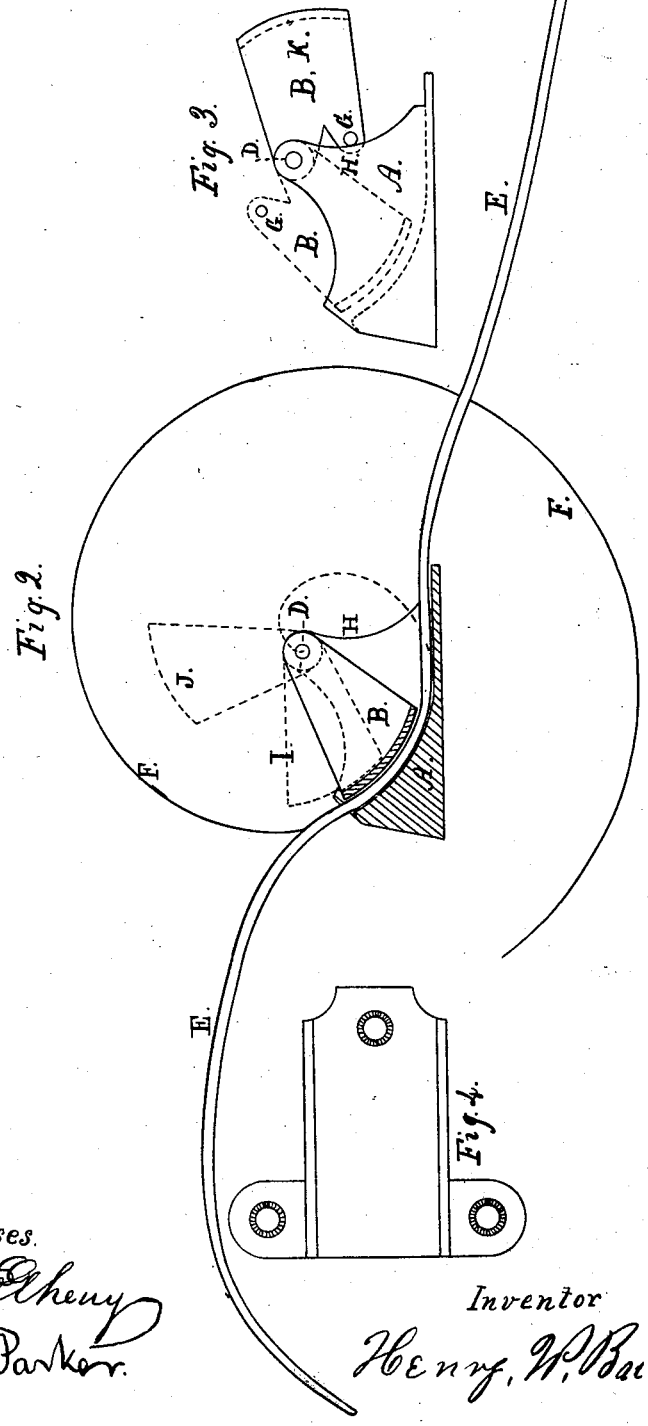

United States Patent Office.

HENRY W. BURGESS, OF ITHACA, NEW YORK.

Letters Patent No. 73,230, dated January 14, 1868.

IMPROVED STRAP-HOLDER.

*The Schedule referred to in these Letters Patent and making part of the same.*

TO ALL WHOM IT MAY CONCERN:

Be it known that I, HENRY W. BURGESS, of Ithaca, Tompkins county, New York, have invented an Improved Strap-Holder; and I do hereby declare that the following is a full and exact description thereof, reference being had to the annexed drawings, and to the letters of reference thereon.

Figure 1 is a view of my strap-holder.

Figure 2, a longitudinal section of my strap-holder, showing a strap in it, and the volute curve by which its clasping surfaces are made.

Figure 3 is a side view, and

Figure 4 a plan of the base of the frame.

My object is to make a device or instrument which will easily fasten a horse by the bridle or halter-strap to a hitching-post, without tying or buckling, by its grasping action on the strap; or by the halter-strap fasten a horse or other animal in the stall or stable in which he is kept; or serve as a neat and convenient means of securing the hold-back strap of a wagon or other vehicle to the thills; or to hold other straps, as desired, in the places to which they are applicable.

To accomplish this, I make a suitable bed-piece or frame, to contain a movable central clasping-piece or jaw, the lower surface of which is a part or portion of the curve of a volute or spiral scroll, and is hinged above the strap in the centre or starting-point of the volute or scroll, and reaches down to and fits a corresponding part of the frame, in such a manner as to grasp and hold the strap of the bridle, halter, or other article between the curved portion of the jaw and the curved part of the frame, and fasten it so long as tension is or has been made in the direction in which the animal is liable to pull, but is readily and conveniently released from the jaw of the instrument when jerked or pulled in the opposite direction. This is seen in the drawings.

In fig. 1, A is the bed or frame-piece, and B the movable central clasping-piece or jaw hinged on the rod D; and E is the strap held between the two parts of my device, which is represented as just ready to close on and hold the strap.

In fig. 2, D is the hinging-rod of the jaw B, and is the centre or starting-point of the volute or spiral scroll F; and A is a section of the bed-piece or frame, showing how its curve is a part, portion, or segment of the volute curve where it holds the strap; and B is a section of the central grasping movable or hinged piece or jaw, also showing that its curved and holding surface is also a part of the volute curve, and that the two surfaces of the frame and of the jaw are fitted to and parallel to each other where they embrace the strap E. It will also be seen in this figure that by the lower dotted lines I the jaw is represented raised from the strap, thus releasing it; and by the upper dotted lines J, that the jaw is still further opened, and that while thus opening, whether the distance of separation be little or much, yet the surface of the curve of the jaw, and that of the frame and of the volute curve, is always in a parallelism to each other. By this means my device admits various straps with diverse thicknesses, and holds them by a broad bearing, and with no injurious wear or clasping of the strap. Thus the opening and closing of the instrument are made to fit any strap. The practical insertion of the strap is from the right hand, by putting in the loose end through the jaws; and when in, it is locked by the simple retraction of the strap backwards or to the right hand.

In fig. 3, the strap is not seen in the strap-holder; but by the dotted lines its place and mode of being held are seen. By the right-hand lines, marked B K, the movable piece or jaw of the holder is seen thrown over, so that it falls and rests by the projection or stud G on the part of the frame at or near H. This position of the movable jaw is a desirable one when the strap is to be inserted into the holder; and as soon as the strap is in, the throwing of the movable jaw over to the position of the left-hand dotted lines locks the strap, aided, if need be, by a jerk or pull on the right-hand end of the strap. So simple is this, that men with one arm, or those with something in one hand, can hitch and unhitch horses and other animals by this instrument; and a little practice soon enables one to fasten a strap in it by a slight jerk, and by a slight pull or jerk loosen an animal, leaving the movable jaw, as seen at B K, as described.

In fig. 4 is a plan of the frame, and the holes for fastening my holder to a post, manger, the thills, or other objects, as seen.

The uses of my invention are apparent to those skilled in the art to which it appertains.

*Claims.*

1. I claim the construction of the strap-holder, when the said surfaces of the movable piece or part B and of the bed or opposing piece or part A are made to be a part or section of the volute curve F, as figured and described.

2. The giving, by the above-named volute-shaped surfaces, an adaptation to varied thickness of straps, and a parallelism to each other of the said surfaces, thereby safely and surely holding the varied straps placed between the grasping-surfaces, as herein described.

3. The combination of the bed-piece A, movable piece or part B, volute-shaped surfaces F, handle G, and hinge D, the same making a strap-holder, as set forth, as an article of manufacture.

HENRY W. BURGESS.

Witnesses:
   T. J. McELHENY,
   SAMUEL J. PARKER.